United States Patent [19]

Okuda

[11] 4,094,179
[45] June 13, 1978

[54] DRIVING DEVICE FOR HIGH SPEED ROLLING MILLS AND THE LIKE

[75] Inventor: Hiroji Okuda, Nara, Japan

[73] Assignee: Koyo Seiko Company Limited, Osaka, Japan

[21] Appl. No.: 818,959

[22] Filed: July 25, 1977

[30] Foreign Application Priority Data

Apr. 19, 1977 Japan .............................. 52/50028

[51] Int. Cl.² .............................................. B21B 31/08
[52] U.S. Cl. ........................................ 72/238; 72/239
[58] Field of Search ......................... 72/249, 238, 239; 64/23

[56] References Cited

U.S. PATENT DOCUMENTS 1,891,579  12/1932  Schreck ................................. 72/239
1,938,932  12/1933  Rafter ................................... 72/239

*Primary Examiner*—Milton S. Mehr

*Attorney, Agent, or Firm*—Mason, Fenwick & Lawrence

[57] ABSTRACT

A spring for longitudinally extending a drive shaft is disposed between a drive shaft member and a driven shaft member which are axially extensibly connected together as by a spline connection. The end surface of a driven shaft element adapted to be loosely fitted in a coupling connected to the driven shaft member has a cylindrical body fixed thereto coaxially with the center hole therein. The inner bottom of the coupling is provided at its center with a fitting hole of large diameter and a number of taper rollers are disposed in an annular space which is defined between the cylindrical body and the fitting hole as a result of the fitting between the coupling and the driven shaft element, thereby automatically bringing the axes of the coupling the driven shaft element into alignment with each other and eliminating the problem of rotational vibration due to the loose fit between the coupling and the driven shaft element.

4 Claims, 4 Drawing Figures

DRIVING DEVICE FOR HIGH SPEED ROLLING MILLS AND THE LIKE

BACKGROUND OF THE INVENTION

The present invention relates to a driving device for rolls in high speed rolling mills and the like.

A drive shaft for driving the working rolls of a rolling mill, for example, interconnects a drive shaft element and the neck portion of the working roll, which is a driven shaft element, and through universal joints included at two places in the drive shaft itself it also effects the centering of the drive and driven shaft elements and the transmission of torque. The fitting yoke and the coupling at the opposite ends of the drive shaft are fitted on the ends of the drive and driven shaft elements, whereby the drive shaft is connected to these shaft elements.

The serious drawback inherent in such conventional drive shaft lies in the fact that in order to facilitate the mounting and dismounting of rolls, the fit between the neck portion of the working roll, which is the driven shaft element, and the coupling is a clearance fit, the clearance resulting in a rotational vibration being exerted in the drive shaft, said rotational vibration being transmitted to the working roll and greately decreasing the accuracy of rolling while repeatedly imparting a vibratory impact to the bearings supporting the working roll and the backup roll and hence damaging these bearings in a short period of time.

On the other hand, recent rolling mills are confronted by the important problems of speeding up the rolling operation and improving the rolling accuracy and the rate of operation. With the conventional driving device, however, the adverse influence of said vibration becomes more conspicuous with the speedup of the rolling mill and there are difficulties in providing a sufficient mechanical strength. If the roll neck and the coupling are fitted together with an interference fit in order to eliminate said vibration, the exchange of rolls would become impossible. Thus, it has been impossible to solve said problems.

As measures to prevent such vibration due to clearance fit, the applicant has previously proposed constructions for fit between the coupling and the driven shaft element, as shown in FIGS. 1 and 2. According to these constructions, to provide for fitting between the coupling A of a drive shaft and a driven shaft element, such as the roll neck B of a working roll, a conical opening $a$ or $b'$ is provided either in the inner bottom surface of the coupling or in the end surface of the roll neck B at its center while a cone $b$ or $a'$ is provided on the other, and said conical opening and cone are fitted together, whereby the central axes of the coupling and working roll are correctly aligned with each other despite said clearance fit. In this case, however, the provision of a cone or a conical opening at the end surface of the roll neck of a working roll results in the center hole of the working roll, which has been provided at said end surface, being damaged, bringing about a drawback that it becomes difficult to determine the base axis in connection with regrinding or re-turning the working roll.

SUMMARY OF THE INVENTION

An object of the present invention is to prevent rotational vibration due to a loose fit between the coupling of the drive shaft and the driven shaft element in a driving device for high speed rolling mills.

Another object of the invention is to provide a driving device having vibration preventing means which does not damage the center hole which has been provided at the neck end surface of a working roll.

According to the invention, disposed in a hollow chamber having a sufficient diameter and axial length defined between two sleeve-like axially expansible shaft members is a spring which acts to expand the drive shaft. Further, in the loose fitting region between the coupling of the drive shaft and the driven shaft element, the end surface of the driven shaft element has a cylindrical body fixed thereto coaxially with the center hole therein while the inner bottom surface of the coupling has a fitting hole of large diameter formed at the center thereof, and a number of taper rollers supported either by the cylindrical body or by the fitting hole are disposed in an annular space which is defined between said cylindrical body and said fitting hole when the coupling and the driven shaft element are fitted together.

Thus, according to the invention, since the construction is such that the coupling and driven shaft element have a loose fit and their axes are aligned with each other with the help of the taper rollers, the mounting and dismounting of the coupling can be greately facilitated, thereby greately reducing the time required for exchange of rolls.

Further, since the axes of the driven shaft element and coupling are brought into alignment with each other by the taper rollers and the pressure of the spring acting on the coupling, the vibration of the drive shaft due to its high speed rotation is eliminated and the rolling accuracy is greately improved while the life of the bearings of the rolls is greatly prolonged.

On the other hand, since it is possible to permit the necessary center hole in the end surface of the driven shaft element to remain intact, the roll can be accurately mounted on a machine tool, e.g., for regrinding or re-turning and the centering thereof is very easy, making is possible to maintain the roll dimensions at a very high level of accuracy and reduce the time involved in this operation.

Further, since the taper rollers are rotatable bodies, there will be little wear thereon and even if there is some amount of play, this does not matter at all because of the pressure of said spring. The axial alignment can be achieved with high accuracy and the exchange of taper rollers, when damaged, is easy.

Further, the design of said spring to have the proper strength and deflection is facilitated and a sufficient mechanical strength is given to the drive shaft while the entire drive shaft dan be compacted. Further, since a spline coupling portion between the shaft members can be disposed at a position radially spaced apart from the central axis of the drive shaft, the resistance to the sliding movement between the two shaft members along the spline coupling portion can be reduced, thus facilitating the extension and collapsing of the drive shaft and reducing wear on the spline coupling portion. A cover is provided for protecting the spline coupling portion against the external atmosphere and lubrication is effected, thereby further enhancing the above-mentioned effects. The action of the spring is effectively utilized to maintain the normal fitting state of the coupling and driven shaft element during the operation of the rolling mill. The life of the spring is also prolonged.

Other objects and features of the invention will become more apparent from the following detailed description.

DESCRIPTION OF THE PREFERRED EMBODIMENT

Figure 1:
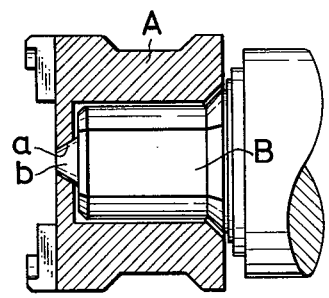
FIG. 1 is a sectional view of a conventional device showing a fit between a coupling and a roll neck.
Figure 2:
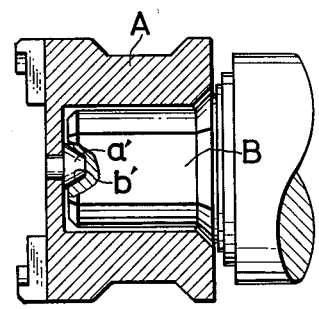
FIG. 2 is a sectional view showing only the principal portion of a conventional device which is a modification of the device shown in FIG. 1.
Figure 3:
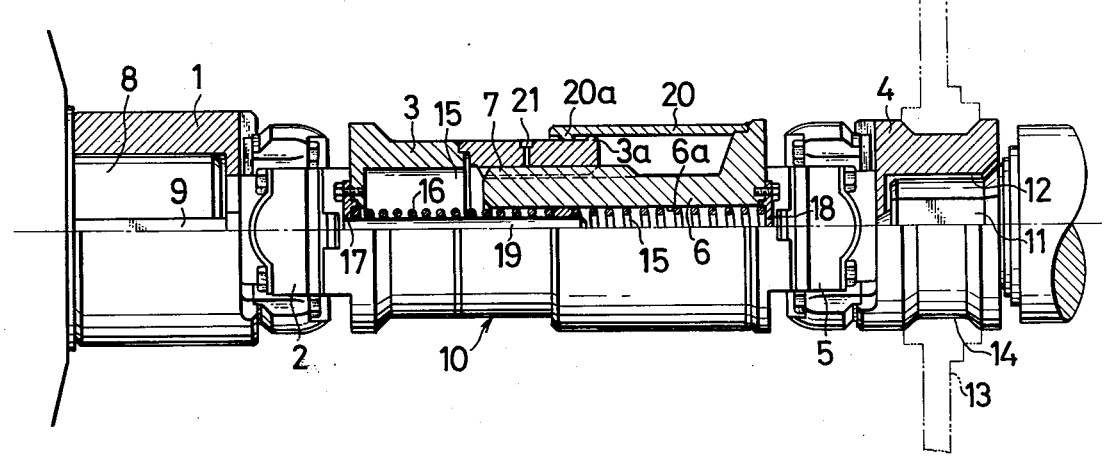
FIG. 3 is a half sectional view showing an example of a drive shaft to which the invention is applicable.

Referring to FIG. 3 showing an embodiment of the invention, a drive fitting yoke 1 is coupled to a drive shaft member 3 by a joint member 2. These members constitute a universal joint and provide one half, serving as a drive assembly, of a drive shaft 10. A driven coupling 4 is coupled to a driven shaft member 6 by a joint member 5. These members constitute a universal joint and provide the other half, serving as a driven assembly, of the drive shaft 10. The two shaft members 3 and 6 are each in the form a sleeve-like cylindrical body and splined to each other as at 7 for rotation as a unit and for an axial sliding movement, whereby the drive shaft 10 is rendered lengthwise extensible.

The drive fitting yoke 1 is in the form of a bottomed cylindrical body fixedly fitted on a drive shaft element 8 as by a shrinkage fit and also keyed thereto as at 9 for rotation as a unit.

The coupling 4 is in the form of a bottomed cylindrical body having a fitting portion 12 adapted to be loosely fitted on the neck of a working roll, i. e., a driven shaft element 11. The driven shaft element 11 and the fitting portion 12 has a known fit, e.g., between a oval-shaped modified shaft and a hole of corresponding shape for the transmission of torque. Therefore, the drive shaft 10 permits the mounting and dismounting of the coupling 4 fitted on the driven shaft element 11 located at a given invariable distance from the drive shaft element 8, owing to the extension and collapsing of the drive shaft resulting from the slide movement of the shaft members 3 and 6.

In order to effect said mounting and dismounting, the coupling 4 is provided with a peripheral groove 14 engageable by dogs 13 of a support device (not shown) which are adapted to grip and axially move the coupling 4.

In the construction described above, defined between the two shaft members 3 and 6 coupled together in such a manner as to be only axially slidable is a hollow chamber 15 longitudinally extending through the axial central portions thereof and having sufficient diametrical and axial dimensions to accommodate a spring 16 which acts in a direction which extends the drive shaft 10. The spring 16 is designed to produce a sufficient deflection to permit the sliding movement of the shaft members 3 and 6 necessary for mounting and dismounting of the coupling 4 relative to the driven shaft element 11. Further, the spring also provides a suitable spring action on the shaft members 3 and 6 with the coupling fitted on the driven shaft element, to maintain the fit between the coupling 4 and the driven shaft element 11 during the operation of the rolling mill against any action which tends to slip off the coupling 4 from the driven shaft element 11.

Figure 4:
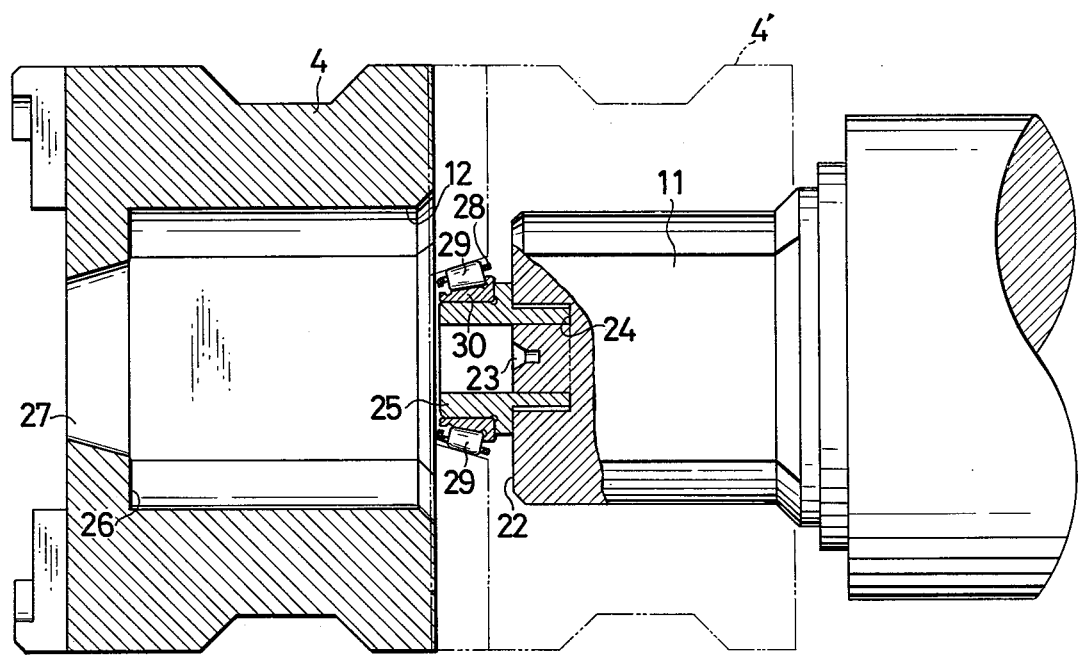
FIG. 4 is an enlarged view, in longitudinal section, of the principal portion of an embodiment of the invention.

On the other hand, the end surface 22 of the driven shaft element is formed with a circumferential groove 24 coaxially surrounding a center hole 23, as shown in FIG. 4 and the base of a cylindrical body 25 is fixedly fitted in said circumferential groove 24 by a shrinkage fit or any other suitable means with a portion of said cylindrical body projecting from said end surface 22 toward the inner bottom surface 26 of the fitting portion 12 of the coupling 4. The inner bottom surface 26 of the coupling 4 is provided at its center with a fitting hole 27 having a diameter substantially larger than the outer diameter of the cylindrical body 25, so that the cylindrical body 25 enters said fitting hole 27 when the coupling 4 is fitted on the driven shaft element 11, while a number of taper rollers 29 annularly arranged as by a retainer 28 are disposed in an annular space defined bwtween the fitting hole 27 and the cylindrical body 25, said taper rollers 29 serving to effect alignment between the axes of the cylindrical body 25 and the fitting hole 27, i.e., the axes of the driven shaft element 11 and the coupling 4.

The taper rollers 29, in the case of the illustrated embodiment, are mounted on an inner ring 30 fitted on the cylindrical body 29 and are thereby carried on the driven shaft element 11, while the fitting hole of the coupling 4 is a conical hole whose wall itself serves as an outer race surface for the taper rollers. However, the manner of supporting the taper rollers is not limited to this arrangement. For example, the coupling 4 may have an outer ring (not shown) attached thereto and taper rollers held together by a retainer may be supported on the inner race surface of said outer ring while the outer surface of the cylindrical body 25 may be a taper surface serving as an inner race surface for the taper rollers. Alternatively, an inner ring which is removable from the group of taper rollers may be fixed to the cylindrical body 25. It goes without saying that the inner diameter of the cylindrical body 25 is at least such that the center of a machine tool is allowed to engage and disengage the center hole 23 at the time of regrinding the roll.

In the drawings, 17 and 18 designate spring seats attached to the opposite ends of the hollow chamber 15 of the shaft members 3 and 6 and sealing the hollow chamber 15 at its opposite ends. The spring 16 is guided by a guide bar 19 attached to the center of the spring seat 17 and by the central hole 6a of the shaft member 6 and is thereby prevented from buckling.

Designated at 20 is a cover fixed on the outer periphery of the base of the shaft member 6 and contacted at its front end with the outer peripheral surface of the shaft member 3 to the extent that it will not interfere with the sliding movement of the shaft members. The front end of the cover at which it slides on the shaft member 3 is circumferentially internally provided with a projection 20a engageable with a projection 3a on the front outer periphery of the shaft member 3. The engagement between the projection 20a and 3a determines the maximum extended length of the drive shaft 10 and holds the shaft members 3 and 6 together against inadvertent disconnection when the drive shaft 10 is removed in its entirety or is being transported or when the coupling 4 is removed from the driven shaft element 11. The cover 20 serves to prevent the entry of dust, scale and the like into the spline coupling portion. It is also possible to provide an unillustrated seal between the cover and the shaft member 3 to prevent leakage of the lubricant contained in the shaft members.

Designated at 21 is an oil port for feeding lubricant to the spline coupling portion. The lubricant thus fed ingresses into the hollow chamber 15, lubricating the spring 16 to prevent the corrosion of the spring and hence prevent the spring, shaft member 6 and guide bar 19 from being fastened with rust.

In the embodiment, the spring 16 has been shown as a single long coil spring, but it may be divided into longitudinal segments with an annular spacer or spring seat interposed between adjacent spring segments. Further, the cylindrical body 25 has been shown separate from the driven shaft element 11, but depending upon the kind of the driven shaft element 11, it may be directly formed on the driven shaft element as a cylindrical portion of suitable diameter without providing a circumferential groove surrounding the center hole 23.

The present invention is arranged in the manner described above. Thus, when the coupling is fitted on the roll neck which is the driven shaft element as in the case of roll exchange, although such fitting is in the nature of a loose fit, the coupling being urged by the spring accommodated in the shaft members through the joint member causes the taper rollers 29 positioned in the annular space between the cylindrical body 25 of the driven shaft element and the fitting hole 27 of the coupling to be brought into contact with the inner and outer race surfaces under the force of said spring, so that the axes of the coupling and the driven shaft element are aligned with each other under a suitable pressure, such fitting state being securely maintained by the force of the spring in the drive shaft.

I claim:

1. A driving device for high speed rolling mills and the like, comprising:

two shaft members on the drive and driven sides, respectively, adapted for rotation as a unit as by a spline connection and axially extensibly coupled together, a spring interposed between said two shaft members and acting in a direction which lengthwise extends said two shaft members, a coupling connected to said driven shaft member by a joint member and loosely fitted on a driven shaft element, said coupling having a fitting hole of large diameter at the center of the inner bottom surface thereof, a cylindrical body projecting from the end surface of said driven shaft element coaxially with the center hole thereof and adapted to enter said fitting hole when the coupling and the driven shaft element are fitted together, said cylindrical body cooperating with said fitting hole to define an annular space therebetween, and a number of taper rollers interposed between said fitting hole and said cylindrical body, said taper rollers being supported for arrangement in said annular space by suitable retaining means and serving to bring the axes of the coupling and the driven shaft element into alignment with each other when the coupling and the driven shaft element are fitted together.

2. A device as set forth in claim 1, wherein said cylindrical body has its base fixedly fitted in a circumferential groove formed in the end surface of said driven shaft element in such a manner as to coaxially surround the center hole thereof and projects from said shaft end surface.

3. A device as set forth in claim 1, wherein said taper rollers are arranged on an inner ring fitted on said cylindrical body while said fitting hole is a conical hole whose wall itself serves as an outer race surface for said taper rollers.

4. A device as set forth in claim 1, wherein said taper rollers are arranged on an outer ring fitted in the fitting hole in the inner bottom of said coupling while said cylindrical body has a taper surface which itself serves as an inner race surface for said taper rollers.

* * * * *